United States Patent [19]

Niibe et al.

[11] Patent Number: 5,332,056
[45] Date of Patent: Jul. 26, 1994

[54] AUTOMATIC BRAKING SYSTEM FOR MOTOR VEHICLE

[75] Inventors: Tadayuki Niibe; Hiroki Uemura; Tohru Yoshioka, all of Hiroshima, Japan

[73] Assignee: Mazda Motor Corporation, Hiroshima, Japan

[21] Appl. No.: 10,042

[22] Filed: Jan. 28, 1993

[30] Foreign Application Priority Data

| Jan. 31, 1992 | [JP] | Japan | 4-015652 |
| Jan. 31, 1992 | [JP] | Japan | 4-015653 |
| Jan. 31, 1992 | [JP] | Japan | 4-015654 |
| Jan. 31, 1992 | [JP] | Japan | 4-015655 |
| Jan. 31, 1992 | [JP] | Japan | 4-015656 |

[51] Int. Cl.$^5$ ............................................. B60T 8/58
[52] U.S. Cl. ................................. 180/169; 303/100; 303/114.3; 364/426.01; 364/461
[58] Field of Search ............... 180/167, 169; 303/95, 303/100, 103, 106, 110, 113.2, 114.3; 188/181 R, 181 C; 364/426.01, 461

[56] References Cited

U.S. PATENT DOCUMENTS

| 3,856,105 | 12/1974 | Lewis et al. | 180/169 |
| 4,491,840 | 2/1985 | Nashikawa et al. | 180/169 |
| 4,505,351 | 3/1985 | Nashikawa et al. | 180/169 |
| 4,778,225 | 10/1988 | Rudolph et al. | 303/100 X |
| 4,899,708 | 2/1990 | Jung | 303/100 X |
| 4,966,248 | 10/1990 | Farr | 180/197 |

FOREIGN PATENT DOCUMENTS

| 14-2565 | 3/1939 | Japan . |
| 14-5668 | 4/1939 | Japan . |
| 1-127446 | 5/1989 | Japan . |

Primary Examiner—Margaret A. Focarino
Assistant Examiner—Peter English
Attorney, Agent, or Firm—Keck, Mahin & Cate

[57] ABSTRACT

An automatic braking system for a motor vehicle includes a sensor for detecting a distance and a relative speed between the vehicle and an obstacle in front of the vehicle. A judging device for judging an alarm sounding region and a region in which the vehicle has a possibility of contact with the obstacle, based on the detected distance and the relative speed and an automatic brake for automatically braking respective wheels when the judging device judges the region in which the vehicle has a possibility of the contact with the obstacle are provided. The automatic brake incudes a vacuum type booster which has a first chamber to which negative pressure is introduced and a second chamber to which atmospheric pressure is introduced. The first chamber is connected to the down stream portion, from a throttle valve, in an intake path of an engine. The booster uses a pressure difference between the negative pressure and the atmospheric pressure. A device for increasing the negative pressure in the first chamber of the automatic brake prior to the operation of the automatic brake is also provided.

22 Claims, 12 Drawing Sheets

AUTOMATIC BRAKING SYSTEM FOR MOTOR VEHICLE

BACKGROUND OF THE INVENTION

1. Field of the Invention

The present invention relates to an automatic braking system for a motor vehicle and, in particular, to an automatic braking system which detects a distance and a relative speed between a vehicle and an obstacle in front of the vehicle and automatically operates brakes of respective wheels in order to avoid contacting the obstacle.

2. Description of the Prior Art

The conventional automatic braking system is disclosed in Japanese Patent Publication No. 39-2565, Japanese Patent Publication No. 39-5668 and the like. The automatic braking system continuously detects a distance and a relative speed between a vehicle and an obstacle in front of the vehicle by an optical device and/or an ultrasonic device, and judges, based on the detected distance and relative speed, whether or not the vehicle has a possibility of contacting with the obstacle. As a result, when the vehicle is judged to have the possibility of contacting the obstacle, an actuator automatically operates brakes of respective wheels in order to avoid the contact with the obstacle.

On the other hand, a vacuum-type booster is known from Japanese Laid-Open Publication No. 1-127446. The vacuum-type booster can generate a large braking force by using a pressure difference between negative pressure made by an intake air of an engine and atmospheric pressure.

The vacuum-type booster could be applied to the above-mentioned conventional automatic braking system. However, when the vacuum-type booster does not have a predetermined negative pressure, the automatic braking system can not obtain enough braking force to avoid the contact with the obstacle in front of the vehicle.

SUMMARY OF THE INVENTION

It is therefore an object of the present invention to provide an automatic braking system for a motor vehicle which can obtain enough negative pressure in the vacuum-type booster.

It is another object of the present invention to provide an automatic braking system for a motor vehicle which improves the running stability of the vehicle.

It is yet another object of the present invention to provide an automatic braking system for a motor vehicle which improves the safety of the vehicle by reducing the vehicle speed.

The above object is achieved according to the present invention by providing an automatic braking system for a motor vehicle comprising means for detecting a distance and a relative speed between the vehicle and an obstacle in front, means for judging an alarm sounding region and a region in which the vehicle has a possibility of contact with the obstacle based on the detected distance and the relative speed, and an automatic brake automatically braking respective wheels when the judging means judges the region in which the vehicle has a possibility of contact with the obstacle. The automatic brake includes a vacuum-type booster which has a first chamber to which negative pressure is introduced and a second chamber to which atmospheric pressure is introduced. The first chamber is connected to a down stream portion from a throttle valve in an intake path of an engine. The booster uses a pressure difference between the negative pressure and the atmospheric pressure. The negative pressure in the first chamber of the automatic brake is increased prior to the operation of the automatic brake.

In a preferred embodiment of the present invention, the negative pressure increasing means includes throttle valve control means for closing the throttle valve for a predetermined time so as to increase the negative pressure in the first chamber of the booster.

In a preferred embodiment of the present invention, the negative pressure increasing means includes transmission control means for prohibiting shift up operation of a transmission so as to increase the negative pressure in the first chamber of the booster.

In a preferred embodiment of the present invention, the negative pressure increasing means includes throttle valve control means for closing the throttle valve completely at a predetermined time so as to increase the negative pressure in the first chamber of the booster after the throttle valve has been opened for a predetermined time.

In a preferred embodiment of the present invention, the negative pressure increasing means includes engine control means for increasing rotation speed of an engine so as to increase the negative pressure in the first chamber of the booster.

In a preferred embodiment of the present invention, the negative pressure increasing means increases the negative pressure in the first chamber of the booster when the transmission is shifted to N range and the vehicle speed has been greater than a predetermined value for a predetermined time.

The above and other objects and features of the present invention will be apparent from the following description and by making reference to the accompanying drawings showed preferred embodiments of the present invention.

DETAILED DESCRIPTION OF THE PREFERRED EMBODIMENTS

Hereinafter, there are described preferred embodiments of the present invention.

Figure 1:
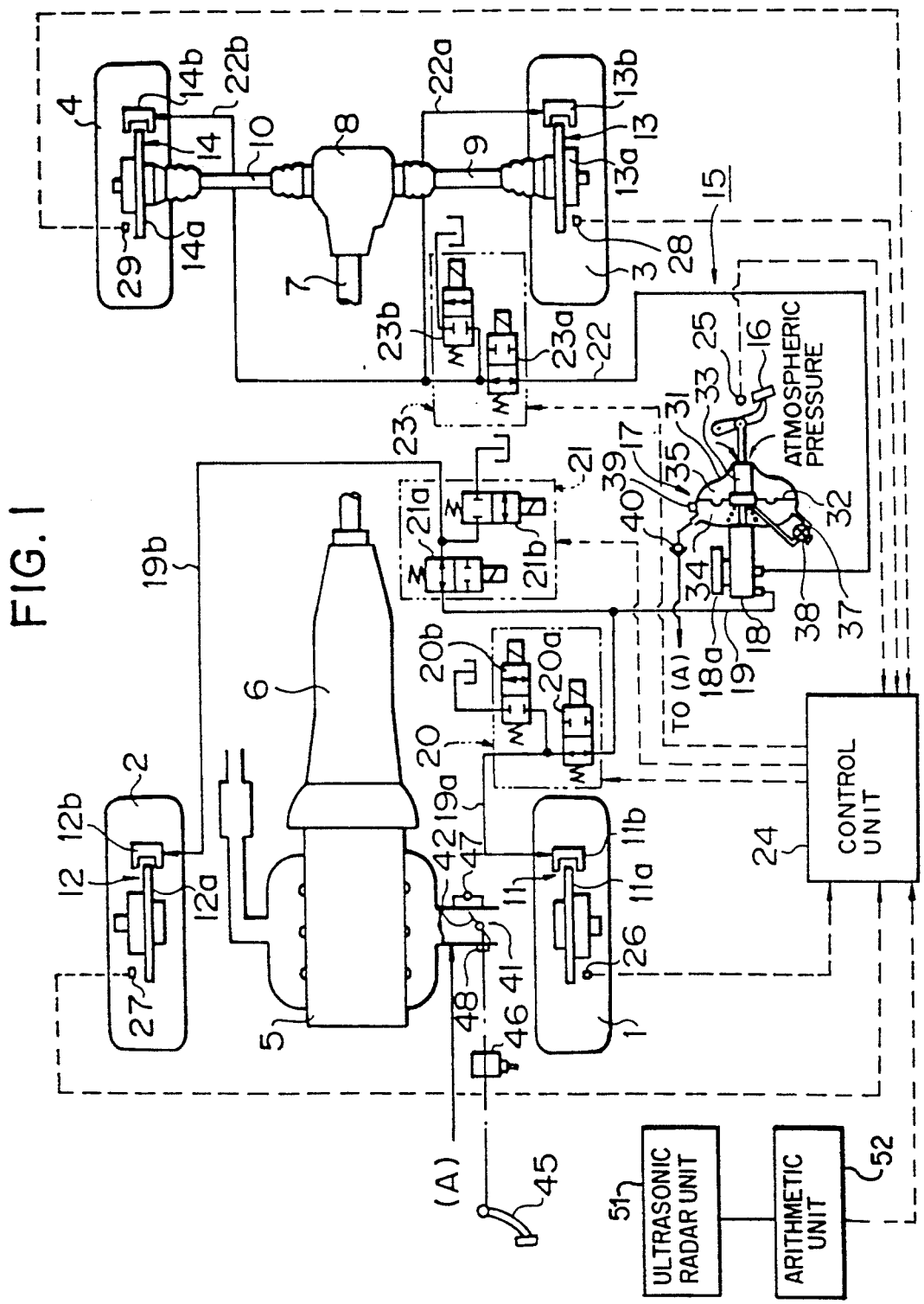
FIG. 1 is a general diagram of a motor vehicle having an automatic braking system in accordance with the present invention.

FIG. 1 is a general diagram of a motor vehicle having an automatic braking system in accordance with the present invention. Referring to FIG. 1, there is shown a motor vehicle having left and right wheels 1, 2 for driven wheels and left and right wheels 3, 4 for driving wheels. In the motor vehicle, an output torque of an engine 5 is transmitted to the left driving wheel 3 and right driving wheel 4 through an automatic transmission 6, a propeller shaft 7, a differential 8 and left and right driving shafts 9, 10.

The above-mentioned wheels 1 to 4 are respectively provided with brakes 11 to 14 which include disks 11a to 14a rotating together with the wheels 1 to 4, calipers 11b to 14b controlling the rotation of the disks 11a to 14a and the like. Further, there is provided a brake control system 15 which controls the brakes 11 to 14.

The brake control system 15 includes a vacuum-type booster 17 which increases an operational force of a brake pedal 16 applied by a driver, and a master cylinder 18 which generates braking force based on the increased operational force. The basic structure of the booster 17 is the same as the conventional vacuum-type booster. Further, as described below, the booster 17 is provided so as to work as an automatic brake when the operational force by the driver is not applied.

To the master cylinder 18 is connected a braking pressure line 19 for the front wheels which branches into branch braking pressure lines 19a, 19b. The lines 19a, 19b are respectively connected to the calipers 11a, 12b in the brakes 11, 12 of the front wheels 1, 2. Further, the branch braking pressure line 19a is provided with a first valve unit 20 including a solenoid switching valve 20a and a solenoid relief valve 20b. Similarly, the branch braking pressure line 19b is provided with a second valve unit 21 including a solenoid switching valve 21a and a solenoid relief valve 21b.

On the other hand, a braking pressure line 22 for the rear wheels is connected to the master cylinder 18 and provided with a third valve unit 23 including a solenoid switching valve 23a and a solenoid relief valve 23b. The line 22 for the rear wheels branches into two branch braking pressure lines 22a, 22b on the down stream portion of the third valve unit 23. The branch lines 22a, 22b are respectively connected to calipers 13b, 14b in brakes 13, 14 of the rear wheels 3, 4.

Namely, the brake control system 15 includes a first channel variably controlling the brake pressure in the brake 11 of the left front wheel 1 by the operation of the first valve unit 20, a second channel variably controlling the brake pressure in the brake 12 of the right front wheel 2 by the operation of the second valve unit 21, and a third channel variably controlling the brake pressures in both the left and right brakes 13, 14 of the rear wheels 13, 14 by the operation of the third valve unit 23, the first, second and third channels being controlled independently.

Moreover, there is provided a control unit 24 which controls the first, second and third channels of the brake control system 15. The control unit 24 independently carries out antilock braking control ( hereinafter called ABS control ) on the first, second and third channels by sending braking pressure control signals respectively to the first, second and third valve units 20, 21, 23. The braking pressure control signals are determined based on a brake signal sent from a brake switch 25 detecting ON/OFF operation of the brake pedal by the driver, and wheel speed signals sent from wheel speed sensors 26 through 29 respectively detecting wheel speeds of the four wheels. That is, the control unit 24 controls the braking forces in the front wheels 1, 2 and rear wheels 3, 4 based on the slip conditions thereof by carrying out respectively a duty control on the openings of switching valves 20a, 21a, 23a and relief valves 20b, 21b, 23b in the first, second and third valve units 20, 21, 23 based on the wheel speed signals sent from the wheel speed sensors 26 through 29. Brake oil drained from the relief valves 20b, 21b, 23b in the first, second and third valve units 20, 21, 23 is returned to a reservoir tank 18a of the master cylinder 18 through a drain line ( not shown ).

During the non-operation of the ABS control, the control unit 24 does not send the brake pressure control signal to the first, second and third valve units 20, 21, 23, and therefore, as shown in FIG. 1, the relief valves 20b, 21b, 23b are maintained so as to be closed and the switching valves 20a, 21a, 23a are maintained so as to be opened. As a result, the braking pressure which is generated in the master cylinder 18 based on the operational force of the brake pedal 16 is supplied to the brakes 11 to 14 in the four wheels 1 to 4 through the brake pressure line 19 for the front wheels and the brake pressure line 22 for the rear wheels, and the braking force based on the braking pressure is applied directly to the front wheels 1, 2 and the rear wheels 3, 4.

Next, the vacuum-type booster 17 will be explained in detail. The booster 17 includes a case 31 attached to a vehicle body and the master cylinder 18. The inner portion of the case 31 is divided into a first chamber 34 and a second chamber 35 by a diaphragm 32 and a valve body 33 connected to the diaphragm 32. The first chamber 34 is connected through a check valve 40 to the down stream portion of the intake path 41 of the engine 5 so that the first chamber 34 has constantly negative pressure which is intake negative pressure of the engine 5. When the brake pedal 16 is not operated by the driver, the second chamber 35 is connected to the first chamber 34, so that the booster does not work. On the other hand, when the brake pedal 16 is operated, the atmospheric pressure is introduced into the second chamber 35 and the diaphragm 32 is moved together with the valve body 33 in the forward direction so that the booster 17 is operated to work. The switching operation of introducing negative pressure and atmospheric pressure into the second chamber 35 is carried out by a valve ( not shown ) provided in the valve body 33.

The structure of the booster 17 explained above is the same as the conventional booster. Since the booster 17 has to work as an automatic brake according to the present invention, there is provided additionally a conduit 37 whose one end is connected to the first chamber 34 and whose other end is connected to the second chamber 35. The conduit 37 is provided with a three-way solenoid switching valve 38 by which switching operation of introducing a negative pressure of the first chamber 34 and atmospheric pressure into the second chamber 35 is carried out. Namely, the second chamber 35 is connected to the first chamber 34 by demagnetization of the switching valve 38 and the atmospheric pressure is introduced into the second chamber 35 by magnetization of the switching valve 38. When the atmospheric pressure is introduced into the second chamber 35 by magnetization of the switching valve 38, the second chamber 35 has the atmospheric pressure even if the brake pedal 16 is not operated. As a result, the booster 17 can generate braking pressure in the master cylinder 18. The first chamber 34 is provided with a pressure sensor 39 for detecting negative pressure therein.

As shown in FIG. 1, there is provided an accelerator pedal 45 whose operational amount is sent to a motor 46 controlling the opening of a throttle valve 42. The intake path 41 is provided with a bypass valve 47 connecting the upstream portion and the down stream portion of the throttle valve 42. Reference numeral 48 shows a throttle valve opening sensor for detecting the opening of the throttle valve 42.

Figure 2:
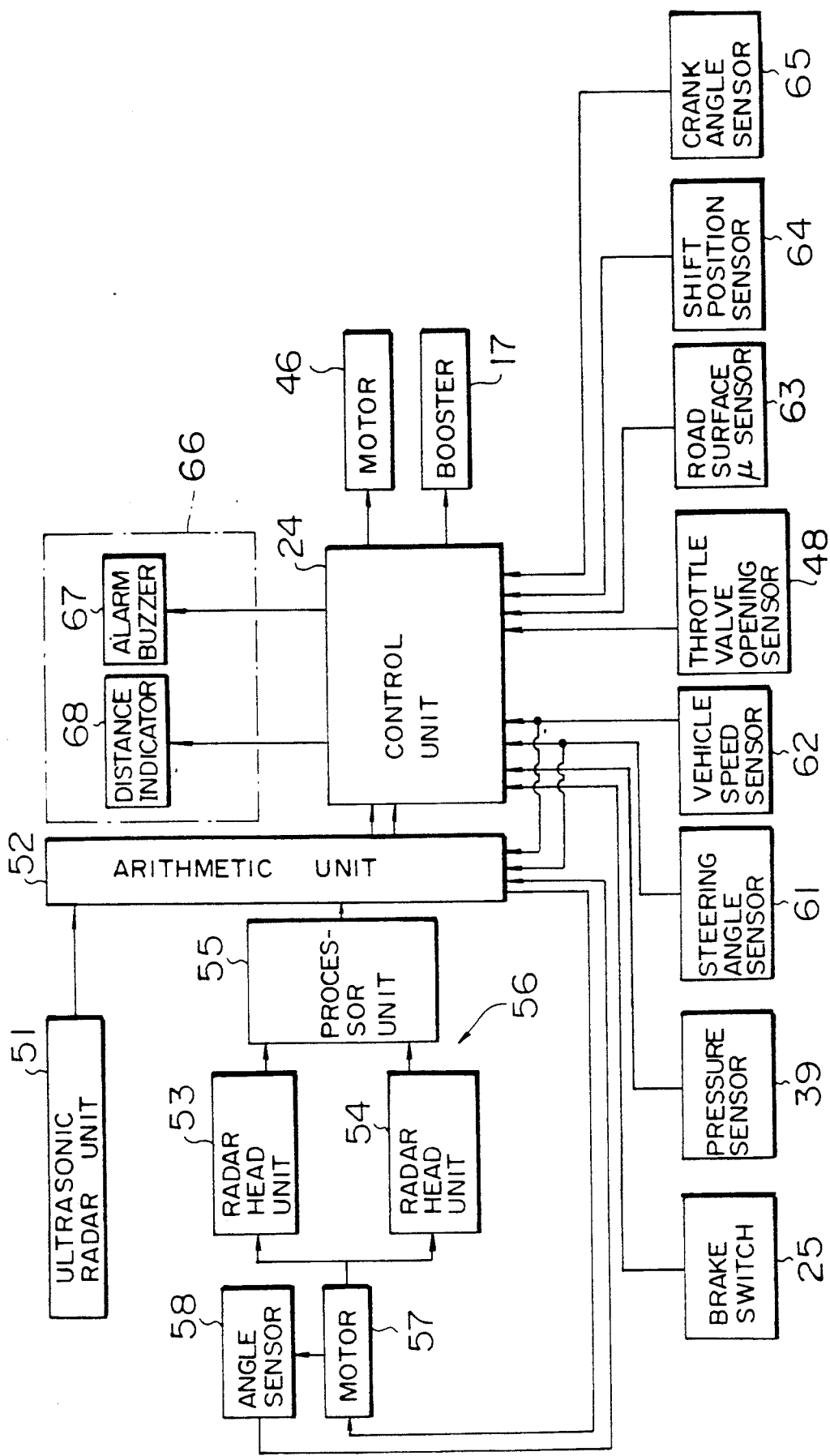
FIG. 2 is a block diagram showing an automatic braking system in accordance with the present invention.

FIG. 2 is a block diagram showing an automatic braking system in accordance with the present invention. Referring to FIG. 2, there is provided an ultrasonic radar unit 51 including a transmitting portion from which an ultrasonic wave is transmitted toward an obstacle such as another vehicle traveling in front of the vehicle and a receiving portion on which the reflecting wave, reflected on the obstacle, is received. The radar unit 51 sends a signal to an arithmetic unit 52 which calculates a distance and a relative speed between the vehicle and the obstacle located in front of the vehicle by using the time delay between the transmitting time and the receiving time in the received radar wave ( Doppler shift ). Further, there are provided a couple of radar head units 53, 54 on the right and left sides of the front portion of the vehicle. The respective radar units 53, 54 include transmitting portions from which a pulse laser beam is transmitted toward an obstacle in front of the vehicle and receiving portions on which the reflecting wave, reflected on the obstacle, is received. The respective radar head units 53, 54 send signals through a processor unit 55 to the arithmetic unit 52 which calculates a distance and a relative speed between the vehicle and the obstacle in front of the vehicle by using the time delay between the transmitting time and the receiving time in the received laser wave. The arithmetic unit 52 employs the distance and the relative speed calculated based on the radar head units 53, 54 preferentially and employs the distance and the relative speed calculated based on the ultrasonic radar unit 51 supplementarily. Thus a distance and relative speed detecting means 56 is provided as described above.

The radar head units 53, 54 are provided with a motor 57 which can change the transmitting and receiving directions of the pulse laser beams in a horizontal direction. The operation of the motor 57 is controlled by the arithmetic unit 52, and the rotation angle of the motor 57 is detected by an angle sensor 58. The angle sensor 58 sends a signal to the arithmetic unit 52 in which the transmitting and receiving direction of the pulse laser beam is obtained and the obtained direction is employed in the above-mentioned calculation of the distance and relative speed.

The brake switch 25 detects a driver's operation of the brake pedal, the pressure sensor 39 detects negative pressure in the first chamber 34 of the booster 17, a steering angle sensor 61 detects a steering angle operated by the driver, a vehicle speed sensor 62 detects a vehicle speed, the throttle valve opening sensor 48 detects an opening of the throttle valve, a road surface $\mu$ sensor 63 detects friction coefficient $\mu$ of the road surface, a shift position sensor 64 detects a shift position of the automatic transmission, and a crank angle sensor 65 detects a rotation speed of the engine. Those detected signals of the sensors 25, 39, 48, 61, 62, 63, 64 and 65 are input to the control unit 24. Further, the distance and relative speed between the vehicle and the obstacle in front of the vehicle obtained in the arithmetic unit 52 are input to the control unit 24. On an instrument panel is provided an alarm unit including an alarm buzzer 67 and a distance indicator 68, both of which receive various signals from the control unit 24. The control unit 24 sends control signals to the motor 46 and the booster 17. Based on those control signals, as described below, the motor 46 carries out a closing operation of the throttle valve and the booster 17 works as an automatic brake.

Figure 3:
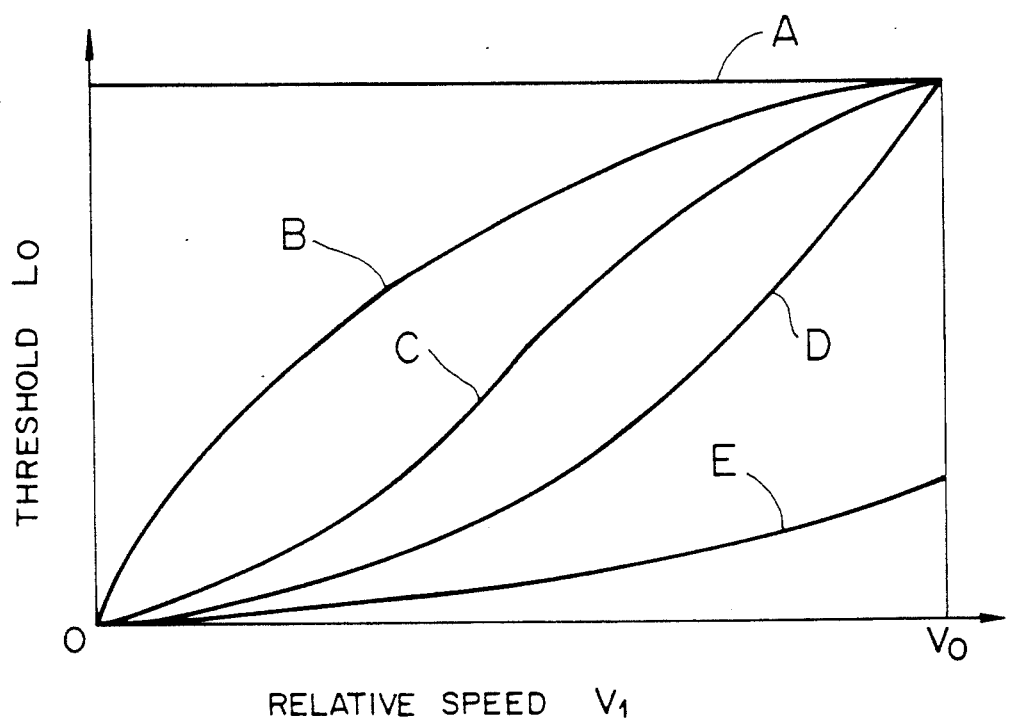
FIG. 3 is a map for determining thresholds employed in the automatic braking system of the present invention.

FIG. 3 is a map for determining thresholds in the automatic braking system of the present invention. When the automatic braking system is operated in order to avoid the contact with the obstacle in front of the vehicle, various kinds of thresholds $L_0$, $L_2$ and $L_3$ are employed. The threshold $L_0$ is a distance between the vehicle and the obstacle located in front of the vehicle at which the automatic brake is started to be operated in order to avoid contact with the obstacle. The threshold $L_0$ for starting the automatic brake is shown as A, B, C, D or E in FIG. 3. The threshold $L_2$ is a distance between the vehicle and the obstacle in front of the vehicle at which the alarm buzzer is sounded prior to the operation of the automatic brake. The threshold $L_2$ is provided as a predetermined value larger than the threshold $L_0$. The threshold $L_3$ is a distance between the vehicle and the obstacle in front of the vehicle at which the automatic brake is stopped from being operated when the possibility of the contact with the obstacle, after the operation of the automatic brake is started, becomes zero. The threshold $L_3$ is provided as a predetermined value which is larger or smaller than the threshold $L_0$.

Referring to FIG. 3, the threshold line A is a distance between the vehicle and the vehicle in front going in the same direction which is necessary for the vehicle to avoid contact with the vehicle in front when the vehicle in front stops by contact with an obstacle in front of the vehicle in front. The threshold line A has no connection with the relative speed $V_1$ between the vehicle and the obstacle in front such as the vehicle in front going in the same direction, and has the same value as the value ($V_0^2/2\ \mu g$) which is provided when the obstacle in front is stopped, that is, the relative speed $V_1$ is equal to the vehicle speed $V_0$. The threshold line B is a distance ($V_1*(2V_0-V_1)/2\ \mu g$) between the vehicle and the vehicle in front going in the same direction which is necessary for the vehicle to avoid the contact with the vehicle in front when the vehicle in front is braked completely. The threshold line C is a distance between the vehicle and the vehicle in front going in the same direction which is necessary for the vehicle to avoid the contact with the vehicle in front when the vehicle in front is braked moderately at the reduced speed $\mu/2\ g$. The threshold line D is a distance ($V_1^2/2\ \mu g$) which is necessary for the vehicle to avoid the contact with the vehicle in front when the vehicle ahead is traveling at the constant speed. Further, the threshold line E is a distance between the vehicle and the vehicle in front based on which the impact force can be reduced even if the vehicle can not prohibit the contact with the vehicle in front with the operation of the automatic brake. The embodiments of the present invention employ the threshold line B. The threshold $L_0$ at the present relative speed $V_1$ is obtained by using the line B. Further, the thresholds $L_2$ and $L_3$ are obtained from the threshold $L_0$.

Next, there will be described control operations carried out by the automatic braking system in accordance with the present invention.

Figure 4:
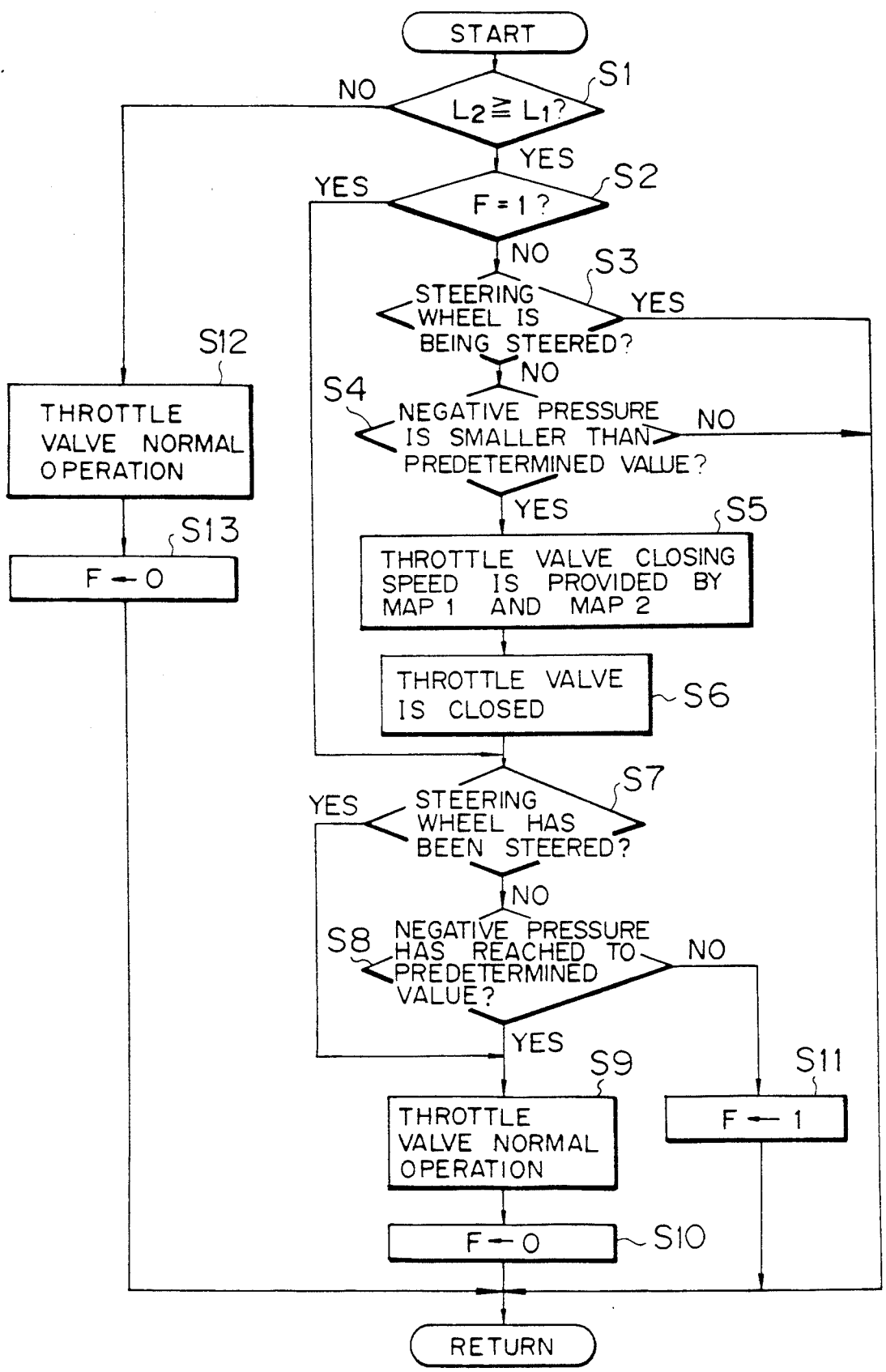
FIG. 4 is a flow chart showing the content of the control operation carried out by the automatic braking system according to the first embodiment of the present invention.

FIG. 4 is a flow chart showing the content of the control operation carried out by the automatic braking system according to the first embodiment of the present invention. Referring to FIG. 4, in S1, it is determined whether or not the distance $L_1$ between the vehicle and the obstacle in front is equal to or smaller than the threshold $L_2$ for sounding the alarm. When $L_1$ is equal to or smaller than $L_2$, it is determined whether or not a flag F is being set to 1 in S2. The flag F being set to 1 (F=1) means that the throttle valve is being controlled so that the negative pressure in the vacuum-type booster is increased, and the flag F being set to zero means that the throttle valve is being normally controlled based on the operational force of the accelerator pedal. When the flag F is not set to 1 in S2, it is determined whether or not the steering wheel is being steered by the driver in S3.

Figure 5:
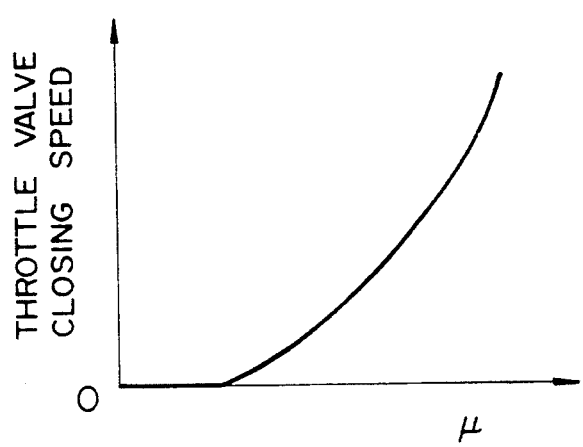
FIG. 5 is MAP1 showing a relationship between a throttle valve closing speed and friction coefficient $\mu$ of the road surface.
Figure 6:
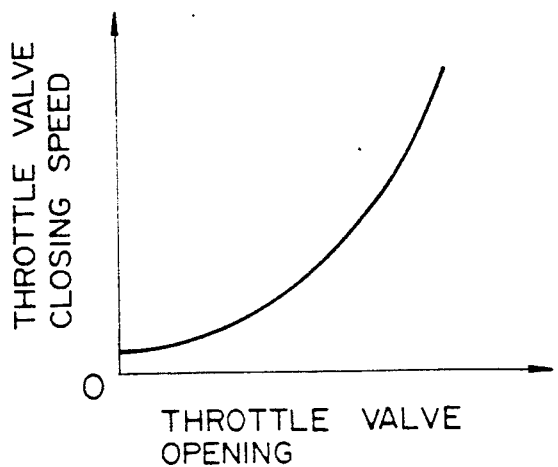
FIG. 6 is MAP2 showing a relationship between a throttle valve closing speed and a throttle valve opening.

When the steering wheel is not being steered in S3, it is determined whether or not the negative pressure in the vacuum-type booster detected by the pressure sensor is smaller than the predetermined value in S4. When the negative pressure in the booster is smaller than the predetermined value, that is, the predetermined negative pressure is not obtained, the closing speed of the throttle valve is provided by using MAP1 and MAP2 in S5. MAP1 and MAP2 are respectively shown in FIG. 5 and FIG. 6. In MAP1, the throttle valve closing speed is zero when the friction coefficient $\mu$ is low. A larger value throttle valve closing speed is provided as the friction coefficient $\mu$ gets higher. The reason why the closing speed of the throttle valve is provided as shown in FIG. 5 is as follows. Since the wheels are easy to lock by the braking operation when the friction coefficient $\mu$ is low, the negative pressure in the vacuum-type booster is required to be small. On the other hand, the negative pressure in the vacuum-type booster has to be increased in a short time. In MAP2, as shown in FIG. 6, the value of the throttle valve closing speed is made smaller as the throttle opening gets smaller. Since the engine responds too quickly to the operation of the throttle valve when the throttle valve opening is small, the throttle valve closing speed is made small so as to prohibit such quick response of the engine. Thus, the throttle valve closing speed is provided in S5, and then the throttle valve is operated to be closed at the speed provided in S5.

The following procedures are carried out during the control operation of closing the throttle valve in order to increase the negative pressure in the vacuum-type booster. Namely, it is determined whether or not the driver has steered the steering wheel in S7. When it is determined that the driver has steered the steering wheel in S7, the procedure proceeds to S9, and the throttle valve closing operation in order to increase the negative pressure in the vacuum type booster is stopped and returned back to the normal control operation of the throttle valve. Then the flag F is set to zero in S10. When it is determined that the driver has not steered the steering wheel in S7, the procedure proceeds to S8, in which it determined whether or not the negative pressure in the vacuum-type booster has reached the predetermined value. When the negative pressure has reached the predetermined value, the procedure proceeds to S9, in which the throttle valve closing operation for increasing the negative pressure is stopped and returned back to the throttle valve normal operation which is carried out based on the operational amount of the accelerator pedal by the driver. When the negative pressure has not reached the predetermined value, the procedure proceeds to S11 in which the throttle valve closing operation is continued by the flag F being set to 1.

On the other hand, when it is determined that L1 is greater than L2 in S1, the procedure proceeds to S12, in which the throttle valve normal operation is carried out based on the operational force of the accelerator pedal by the driver. Then, the flag F is set to zero in S13.

As described above, it is determined whether or not the negative pressure in the vacuum type booster has reached the predetermined value in S8. Instead of that, it may be determined whether or not the predetermined time has passed in S8.

According to the above-mentioned embodiment of the present invention, since the throttle valve is being closed during the predetermined time in the alarm sounding region where the distance $L_1$ between the vehicle and the obstacle in front is smaller than the threshold $L_2$, the vacuum-type booster can obtain enough negative pressure so as to work as an automatic brake.

Further, when the steering wheel is being steered or has been steered by the driver, the throttle valve closing operation for increasing the negative pressure in the booster is stopped and returned back to the normal control operation of the throttle valve. If the throttle valve closing operation is carried out during the steering operation, side slips might occur because the engine brake starts to work. The embodiment of the present invention can prohibit such side slips. Moreover, since the driver's operation of the steering wheel has a first priority, the driver can avoid dangerous situations easily by the steering operation and the accelerator operation. As a result, the running stability of the vehicle can be improved during the steering operation of the driver.

Figure 7:
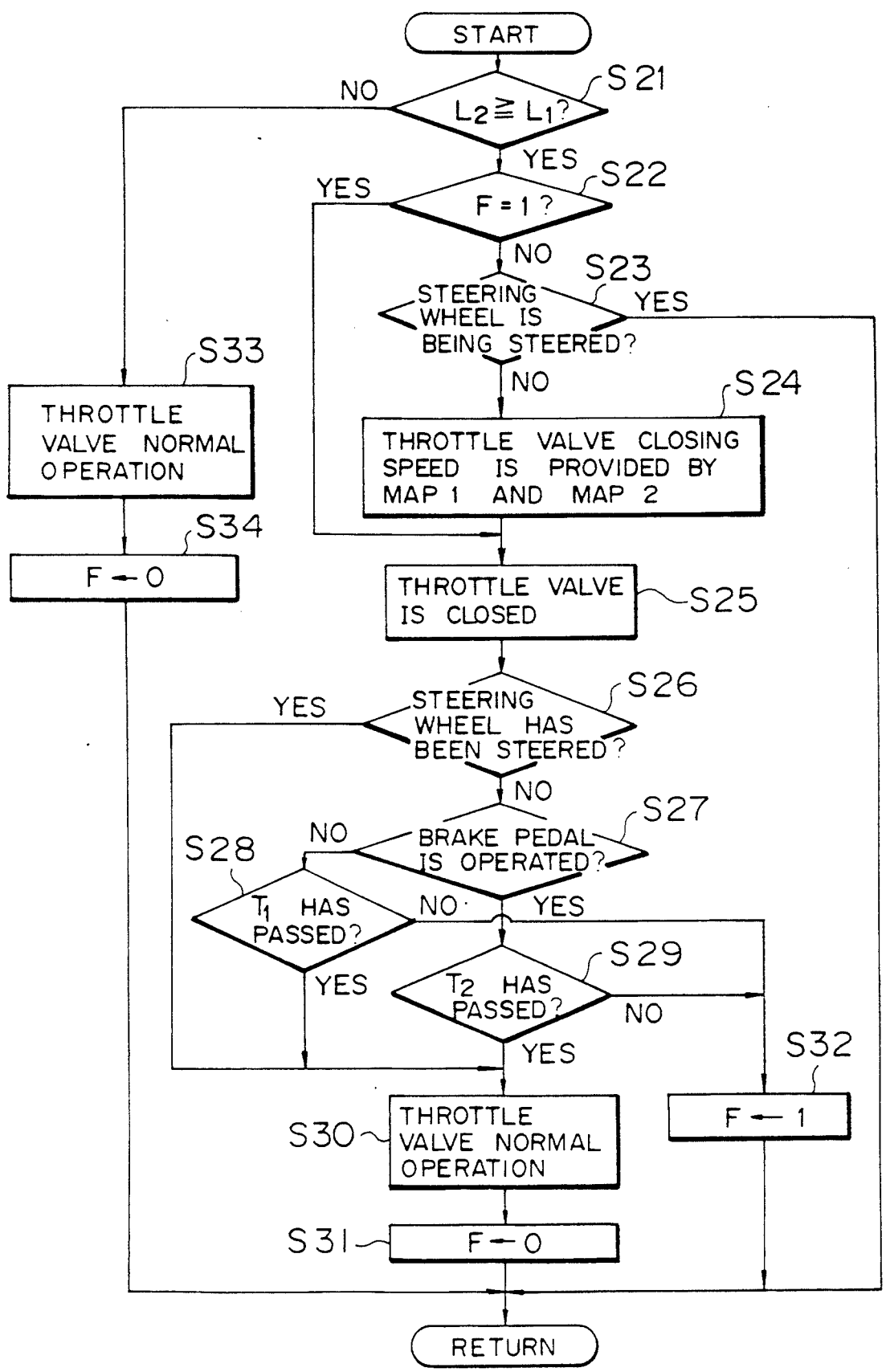
FIG. 7 is a flow chart showing the content of the control operation carried out by the automatic braking system according to another example of the first embodiment of the present invention.

FIG. 7 is a flow chart showing the content of the control operation carried out by the automatic braking system according to another example of the first embodiment of the present invention. Referring to FIG. 7, there will be explained an automatic braking system which does not have a pressure sensor detecting the negative pressure in the booster. First, in S21, it is determined whether or not the distance $L_1$ between the vehicle and the obstacle in front is equal to or smaller than the threshold $L_2$ for sounding the alarm. When $L_1$ is equal to or smaller than $L_2$, it is determined whether or not flag F is set to 1 in S22. When it is determined that the flag F is not set to 1 in S22, it is determined whether or not the steering wheel is being steered by the driver in S23.

When the steering wheel is not being steered in S23, the closing speed of the throttle valve is provided by using MAP1 and MAP2 in S24. After that, the procedure proceeds to S25 in which the throttle valve is operated to be closed at the speed provided in S24.

The following procedures are carried out during the control operation of closing the throttle valve in order to increase the negative pressure in the vacuum-type booster. Namely, it is determined whether or not the driver has steered the steering wheel in S26. When it is determined the driver has steered the steering wheel in S26, the procedure proceeds to S30, in which the throttle valve closing operation in order to increase the negative pressure in the vacuum type booster is stopped and returned back to the throttle valve normal operation. Then the flag F is set to zero in S31. When it is determined that the driver has not steered the steering wheel in S26, the procedure proceeds to S27, in which it determined whether or not the operation of the brake pedal was carried out prior to the throttle valve closing operation. When it is determined that the brake pedal operation was not carried out in S27, the procedure proceeds to S28, in which it is determined whether or not a predetermined time $T_1$ has passed. That is, the throttle valve closing operation is continued during the predetermined time $T_1$. When it is determined the brake pedal operation was carried out in S27, the procedure proceeds to S29, in which a predetermined time $T_2$ has passed where $T_2$ is set as a value larger than $T_1$ ($T_2 > T_1$). That is, when the brake pedal operation was carried out, the throttle valve closing operation is continued during a time longer than when the brake pedal operation was not carried out. As a result, the vacuum-type booster can obtain enough negative pressure so as to work as an automatic brake even if the negative pressure in the booster is reduced by the brake pedal being operated. When it is determined the predetermined time $T_1$ has passed in S28, the procedure proceeds to S30, in which the throttle valve closing operation for increasing the negative pressure is stopped and returned back to the throttle valve normal operation. Then the flag F is set to zero in S31.

When it is determined that the predetermined time $T_1$ has not passed in S28 or the predetermined time $T_2$ has not passed in S29, the procedure proceeds to S32, in which the throttle valve closing operation is continued by the flag F being set to 1.

On the other hand, when it is determined that $L_1$ is greater than $L_2$ in S21, the procedure proceeds to S33, in which the throttle valve normal operation is carried out based on the operational force of the accelerator pedal by the driver. Then, the flag F is set to zero in S34.

Although the automatic braking system described above with reference to FIG. 7 does not includes a pressure sensor for detecting the negative pressure in the vacuum type booster, the system has the same advantages as that shown in FIG. 4 has.

According to the first embodiment of the present invention, as described above, the vacuum-type booster can obtain enough negative pressure so as to work as an automatic brake by the throttle valve closing operation. As a result, the automatic brake can be operated with certainty even if the distance between the vehicle and the obstacle in front is smaller than the threshold $L_0$ at which the automatic brake starts to be operated. Further, the running stability of the vehicle can be improved.

Figure 8:
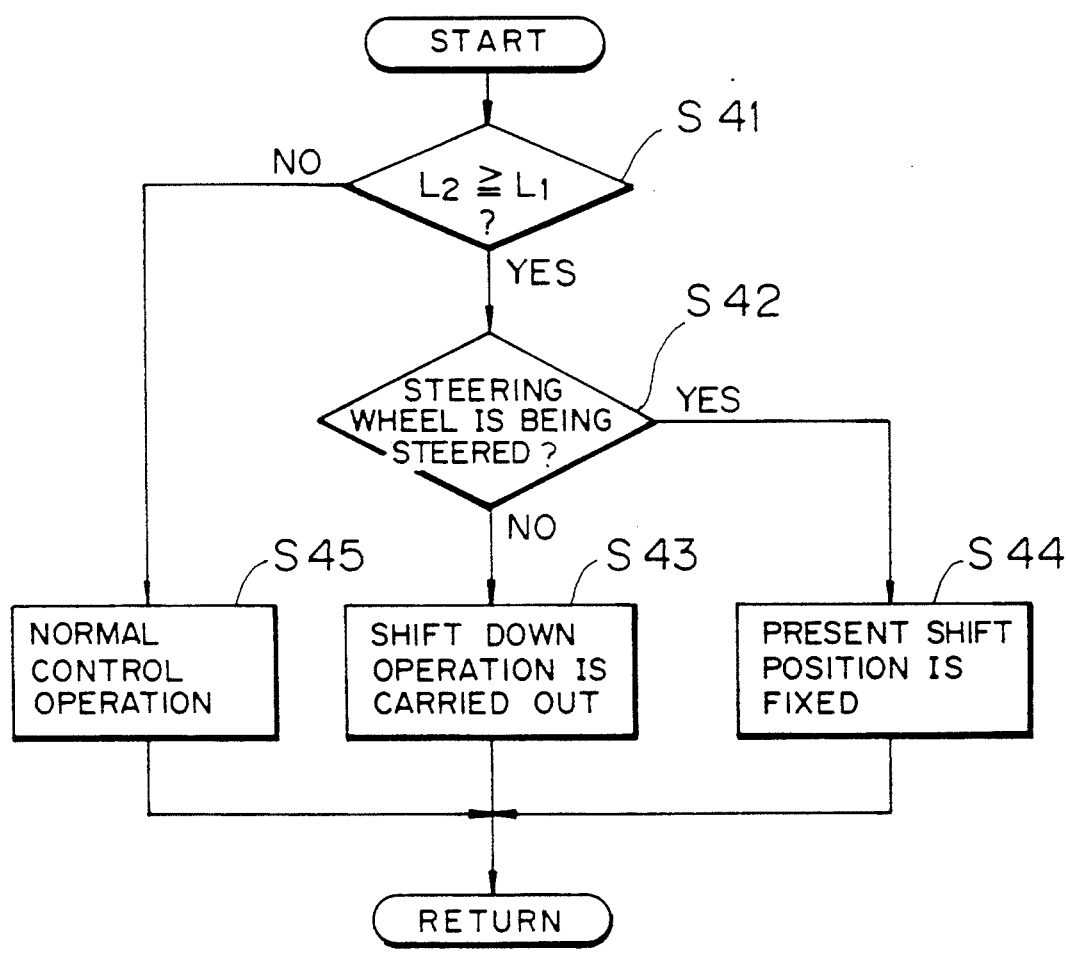
FIG. 8 is a flow chart showing the content of the control operation carried out by the automatic braking system according to the second embodiment of the present invention.

FIG. 8 is a flow chart showing the content of the control operation carried out by the automatic braking system according to the second embodiment of the present invention. Referring to FIG. 8, first, in S41, it is determined whether or not the distance $L_1$ between the vehicle and the obstacle in front is equal to or smaller than the threshold $L_2$ for sounding the alarm. When it is determined that $L_1$ is equal to or smaller than $L_2$ in S41, it is determined whether or not the steering wheel is being steered by the driver in S42. When the steering wheel is not being steered, the procedure proceeds to S43, in which the shift down operation of the automatic transmission is carried out. When the steering wheel is being steered, the procedure proceeds to S45, in which the present shift position of the automatic transmission is fixed. When it is determined that L1 is greater than L2 in S41, the procedure proceeds to S45, in which the normal control operation of the transmission is carried out.

According to the second embodiment of the present invention, when the vehicle is traveling in the alarm region ($L_2$ is equal to or greater than $L_1$) and the steering wheel is not being steered by the driver, the shift down operation in the automatic transmission is forced to be carried out. As a result, since the shift down operation of the automatic transmission makes the vehicle have a low acceleration, the vehicle speed is hard to increase. Therefore, the stability of the vehicle can be increased in the alarm region prior to the region where the automatic braking system is to be operated.

Further, since the rotation speed of the engine increases by the shift down operation of the automatic transmission, the more the rotation speed of the engine increases, the more the negative pressure on the down stream portion from the throttle valve 42 in the intake path 41 increases. As a result, the negative pressure in the first chamber 34 of the vacuum-type booster 17 can be effectively increased.

Moreover, since the present shift position of the automatic transmission is fixed when the steering wheel is being steered by the driver, the steering operation by the driver is given a first priority. Therefore, the driver can easily avoid dangerous situations by the steering operation and accelerator operation. As a result, the running stability of the vehicle can be improved during the steering operation of the driver.

The second embodiment described above is applied to the vehicle having an automatic transmission. The second embodiment of the present invention may be applied to the vehicle having a manual transmission which includes a device carrying out the shift down operation forcefully.

According to the second embodiment of the present invention, since the shift up operation of the transmission is prohibited in the alarm sounding region, the rotation speed of the engine increases. Therefore, the vacuum-type booster can obtain enough negative pressure so as to work as an automatic brake. Further, the automatic brake can be operated even if the distance between the vehicle and the obstacle in front is smaller than the threshold L0 at which the automatic brake starts to be operated.

Figure 9:
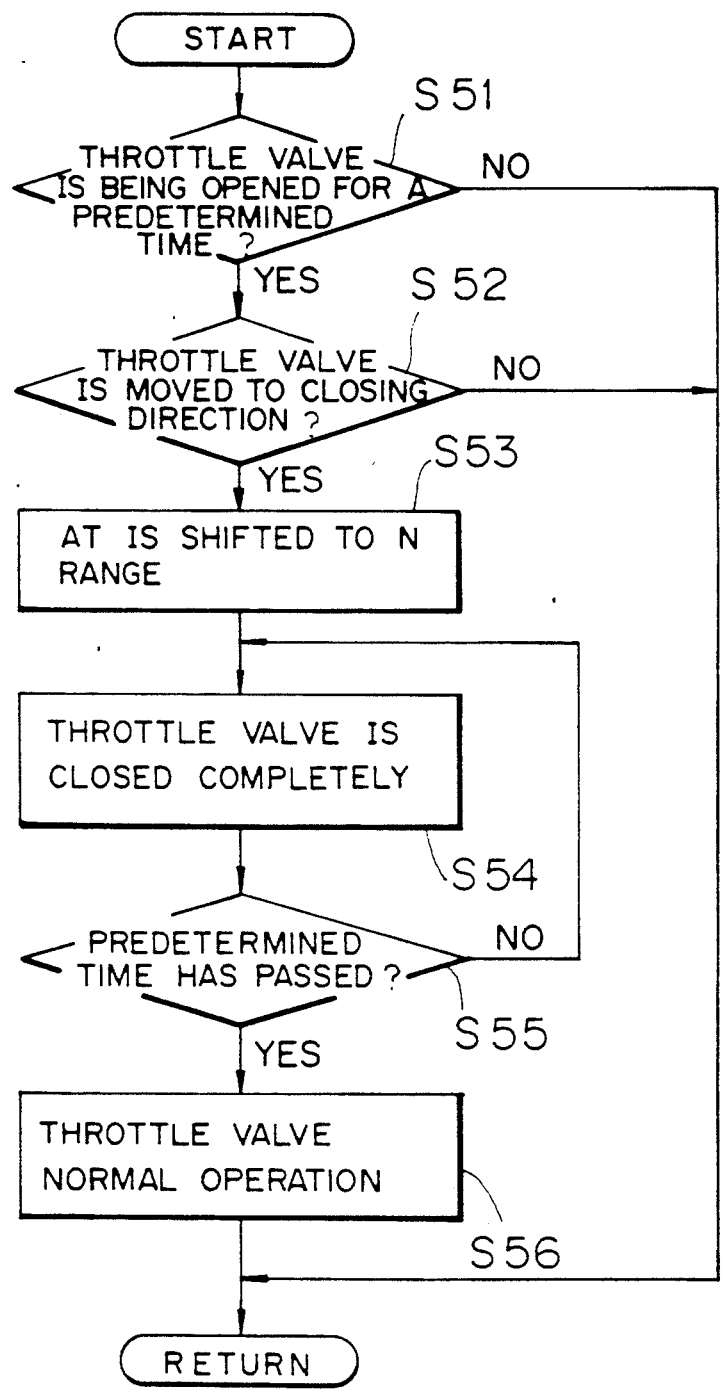
FIG. 9 is a flow chart showing the content of the control operation carried out by the automatic braking system according to the third embodiment of the present invention.

FIG. 9 is a flow chart showing the content of the control operation carried out by the automatic braking system according to the third embodiment of the present invention. Referring to FIG. 9, first, in S51, it is determined whether or not the condition of the throttle valve being opened has continued for a predetermined time. The predetermined time means the time which is necessary where the vehicle is accelerated at a parking lot or a toll gate on an expressway and then reaches to the cruising speed. When the predetermined time has passed, it is determined whether or not the throttle valve is moved to the closing direction in S52. That is, it is determined whether or not the driver returns the accelerator pedal. When the throttle valve is moved to the closing direction, the automatic transmission is shifted to N range in S53, and then the throttle valve is operated to be closed completely in S54. Since the throttle valve is operated to be closed completely, the negative pressure in the vacuum-type booster can be increased. Further, since the throttle valve is closed when the automatic transmission is in the N range, the vehicle has no shock.

Next, the procedure proceeds to S55, in which a predetermined time has passed. The predetermined time means the time which is necessary for the vacuum-type booster to obtain enough negative pressure so as to work as an automatic brake. When the predetermined time has not passed, the procedure returns back to S54, in which the condition of the throttle valve being completely closed is continued. When the predetermined time has passed, the procedure proceeds to S56, in which the throttle valve closing control operation for increasing the negative pressure is stopped and returned back to the throttle valve normal operation which is carried out based on the operational amount of the accelerator pedal determined by the driver.

Where the vehicle is accelerated at the parking lot or the toll gate on the expressway and then reaches the cruising speed, the negative pressure in the vacuum-type booster is used and therefore the negative pressure becomes short when the automatic brake actually works. However, according to the third embodiment of the present invention, under such situations, the throttle valve is forced to be closed when the driver returns back the accelerator pedal after the throttle valve has been opened for the predetermined time. The vacuum type booster, therefore can obtain enough negative pressure so as to work as an automatic brake.

Further, according to the third embodiment of the present invention, since the automatic transmission is shifted to the N range and then the throttle valve is closed completely, the vehicle has no shocks.

The third embodiment of the present invention may be applied to a vehicle having a manual transmission.

According to the third embodiment of the present invention, as described above, the vacuum-type booster can obtain enough negative pressure so as to work as an automatic brake by carrying out the throttle valve closing operation with the throttle valve being closed completely. As a result, the automatic brake can be operated certainly even if the distance between the vehicle and the obstacle in front is smaller than the threshold $L_0$ at which the automatic brake starts to be operated.

Figure 10:
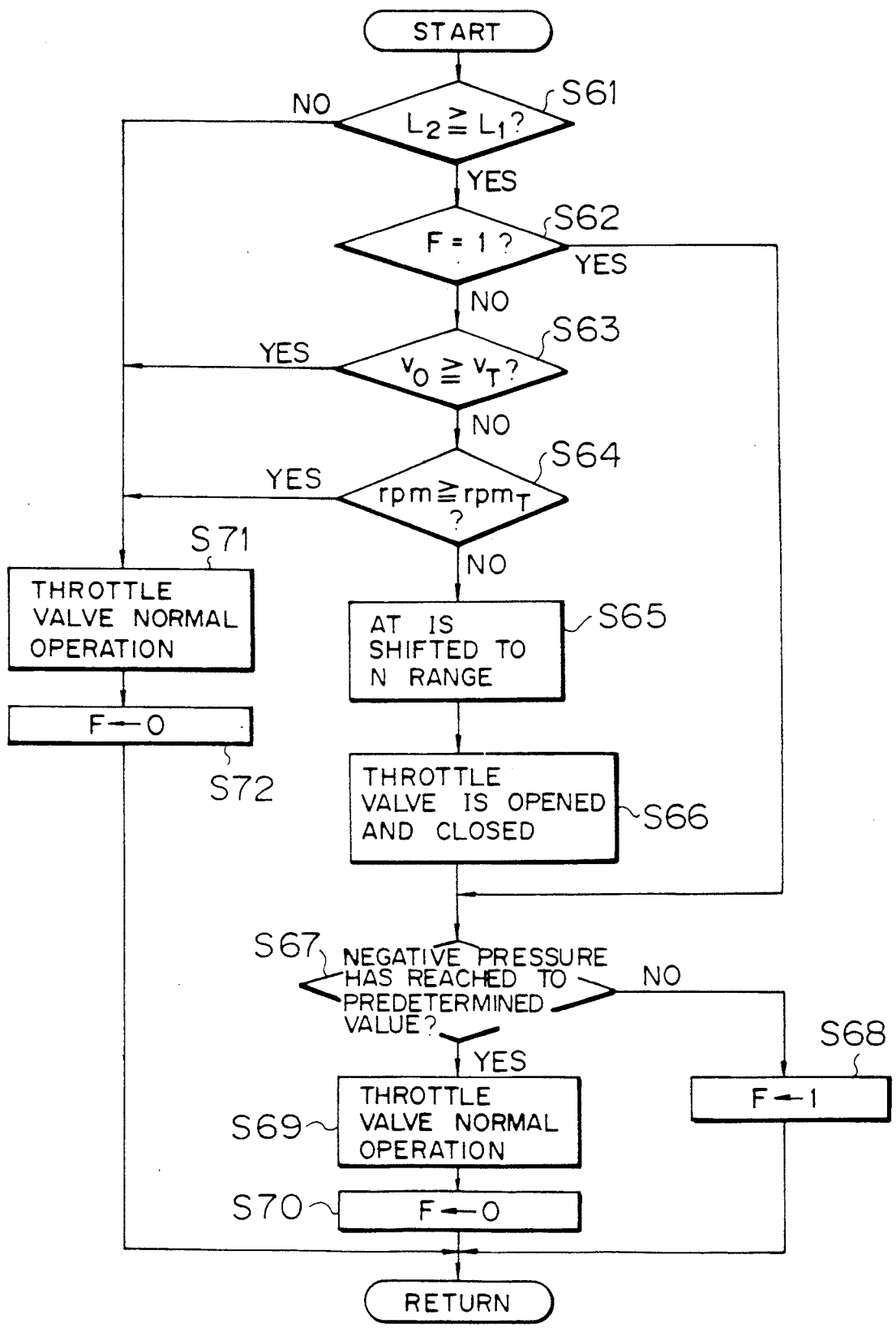
FIG. 10 is a flow chart showing the content of the control operation carried out by the automatic braking system according to the fourth embodiment of the present invention.

FIG. 10 is a flow chart showing the content of the control operation carried out by the automatic braking system according to the fourth embodiment of the present invention. Referring to FIG. 10, in S61, it is determined whether or not the distance $L_1$ between the vehicle and the obstacle in front is equal to or smaller than the threshold $L_2$ for sounding the alarm. When $L_1$ is equal to or smaller than $L_2$, it is determined whether or not flag F is set to 1 in S62. The flag F being set to 1 (F=1) means that the throttle valve is being controlled so that the negative pressure in the vacuum-type booster is increased, and the flag F being set to 0 means that the throttle valve is being normally controlled based on the operational force of the accelerator pedal. When the flag is not set to 1 in S62, it is determined whether or not the vehicle speed $V_0$ is equal to or greater than a target vehicle speed $V_T$ (e.g. 20 km/h) in S63.

When the vehicle speed $V_0$ is smaller than the target vehicle speed $V_T$, the procedure proceeds to S64, in which the rotation speed (rpm) of the engine is equal to or greater than the target rotation speed ($rpm_T$) of the engine. When the engine rotation speed is smaller than the target engine rotation speed, the procedure proceeds to S65, in which the automatic transmission is shifted to N range. After that, in S66, the throttle valve is operated to be opened once and then closed finally.

Next, in S67, it is determined whether or not the negative pressure in the vacuum-type booster detected by the pressure sensor has reached a predetermined value. When it is determined that the negative pressure has not reached the predetermined value, the procedure proceeds to S68, in which the throttle valve closing operation is continued by the flag F being set to 1. When it is determined that the negative pressure has reached to the predetermined value, the procedure proceeds to S69, in which the throttle valve closing control operation is stopped and returned back to the throttle valve normal operation which is carried out based on the operational amount of the accelerator pedal. Then the flag F is set as zero in S70.

On the other hand, the procedure proceeds to S71, when it is that determined $L_1$ is greater than $L_2$ in S61, it is determined that the vehicle speed $V_0$ is equal to or greater than the target vehicle speed $V_T$ in S63, or that the engine rotation speed is equal to or greater than the target engine rotation speed in S64. The throttle valve normal operation is carried out based on the operational force of the accelerator pedal in S71, and then the flag F is set to zero in S72.

As described above, it is determined whether or not the negative pressure in the vacuum-type booster has reached the predetermined value in S67. Instead of that, it may be determined whether or not the predetermined time has passed in S67.

According to the fourth embodiment of the present invention, since the engine rotation speed is increased in the alarm sounding region in which the distance $L_1$ between the vehicle and the obstacle in front is smaller than the threshold L2, the vacuum-type booster can obtain enough negative pressure so as to work as an automatic brake.

Namely, since the engine rotation speed is increased by the operation of the throttle valve being opened once and closed finally, the negative pressure on the down stream portion from the throttle valve in the intake path of the engine can be increased and therefore the negative pressure in the vacuum type booster can be increased.

Further, since the control operation by which the throttle valve is opened once and closed finally is carried out when the automatic transmission is in the N range, the vehicle has no shocks.

According to the fourth embodiment of the present invention, since such control operation of the throttle is carried out when the vehicle is traveling at a relatively low speed (when $V_0$ is smaller than $V_T$), even if the brake pedal is operated so often such as when the vehicle is traveling on the downhill road, the vacuum type booster can obtain enough negative pressure.

Figure 11:
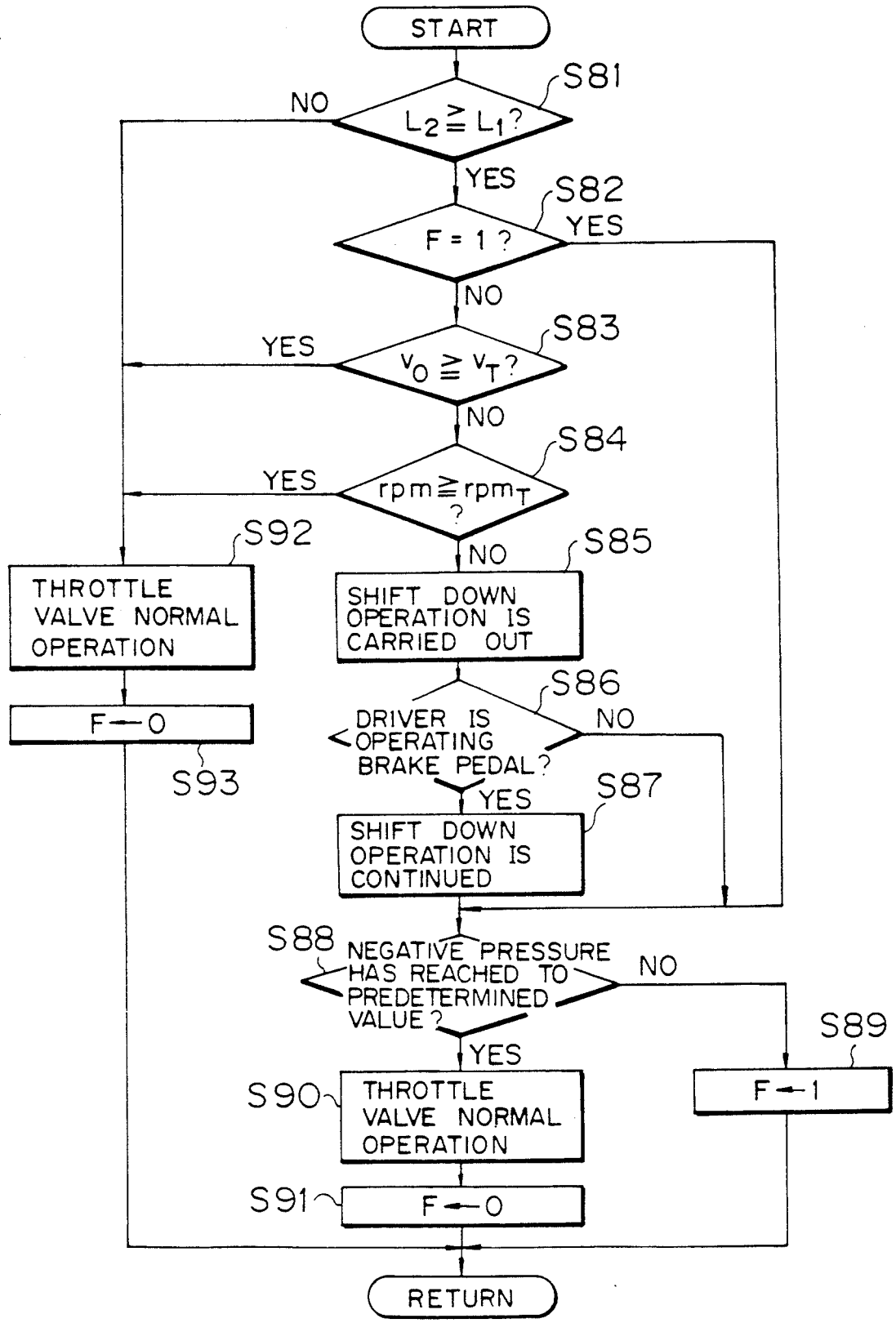
FIG. 11 is a flow chart showing the content of the control operation carried out by the automatic braking system according to another example of the fourth embodiment of the present invention.

FIG. 11 is a flow chart showing the content of the control operation carried out by the automatic braking system according to another example of the fourth embodiment of the present invention.

The example of the fourth embodiment shown in FIG. 11 employs means for increasing the engine rotation speed which is different from the means shown in FIG. 10. Namely, in S65 and S66 of FIG. 10, the engine rotation number is increased by the operation in which the automatic transmission is shifted to N range and then the throttle valve is opened once and closed finally.

Referring to FIG. 11, S81 through S84 are as same as those in FIG. 10. In S85, the shift down operation in the automatic transmission is carried out. Here the shift down operation is carried out on one stage such as the fourth speed to third speed. Next, it is determined if the driver is operating the brake pedal in S86. When the driver is not operating the brake pedal, only one stage is shifted down. When the driver is operating the brake pedal, the procedure proceeds to S87, in which the shift down operation is continued. At this time, the shift down operation is carried out on the third stage to the second stage and further to the first stage. On the other hand, S88 through S93 in FIG. 11 are the same as those in FIG. 10.

In the control operation shown in FIG. 11, the shift down operation of the automatic transmission is carried out in order to increase the engine rotation speed. Further, the shift down operation is continued when the driver is operating the brake pedal. As a result, even if the negative pressure in the vacuum-type booster is used by the driver's brake pedal operation, since the engine rotation speed is increased by the shift down operation and therefore the negative pressure on the down stream portion from the throttle valve in the intake path of the engine is increased, the negative pressure in the vacuum-type booster can be increased.

The example of the fourth embodiment of the present invention may be applied to the vehicle having a manual transmission which includes a device carrying out the shift down operation forcefully.

According to the fourth embodiment of the present invention, as described above, the vacuum-type booster can obtain enough negative pressure so as to work as an automatic brake since the negative pressure on the down stream portion from the throttle valve in the intake path of the engine is increased by the engine intake rotation speed being increased. As a result, the automatic brake can be operated with certainty even if the distance between the vehicle and the obstacle ahead is smaller than the threshold $L_0$ at which the automatic brake starts to be operated.

Figure 12:
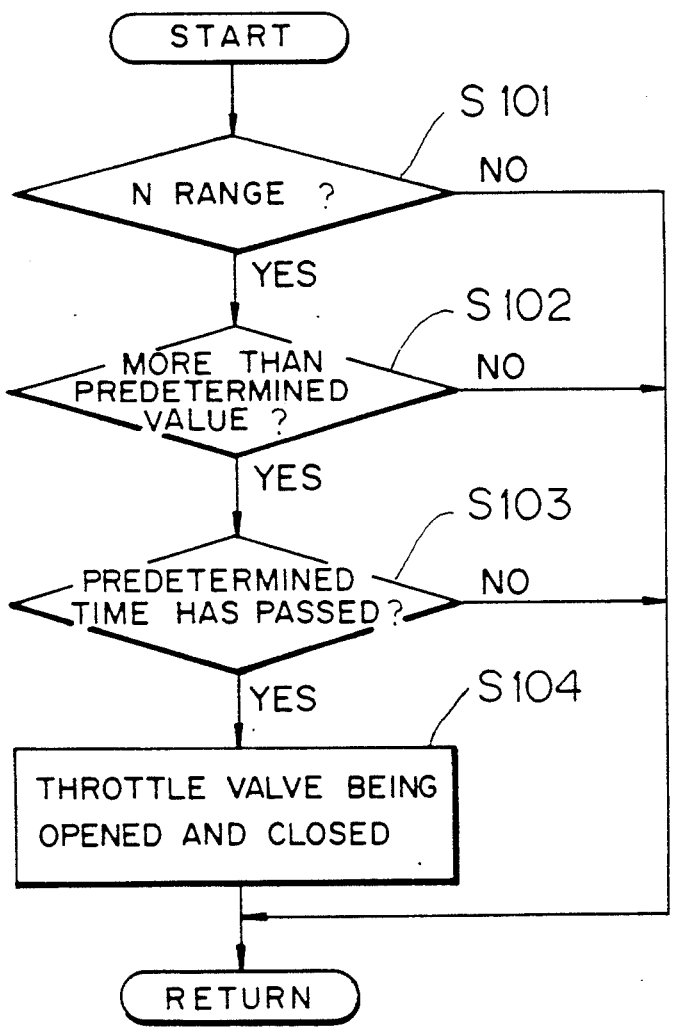
FIG. 12 is a flow chart showing the content of the control operation carried out by the automatic braking system according to the fifth embodiment of the present invention.

FIG. 12 is a flow chart showing the content of the control operation carried out by the automatic braking system according to the fifth embodiment of the present invention. Referring to FIG. 12, first, in S101, it is determined whether or not the automatic transmission is being shifted to the N range. When the automatic transmission is being shifted to N range, the procedure proceeds to S102, in which it is determined if the vehicle is traveling at a speed equal to or greater than a predetermined speed. That is, in S101 and S102, it is determined if the vehicle is traveling on the downhill road when the automatic transmission is being shifted to the N range. At the time, the driver usually operates the brake pedal often.

When the vehicle is traveling at a speed equal to or greater than the predetermined speed, the procedure proceeds to S103, in which it is determined whether or not a predetermined time has passed. That is, after the predetermined time has passed, it is considered that the negative pressure in the vacuum type booster is reduced so that the booster does not have enough negative pressure so as to work as an automatic brake. When it is determined that the predetermined time has passed, the procedure proceeds to S104, in which the throttle valve is operated to be opened once and closed finally.

According to the fifth embodiment of the present invention, since the engine rotation speed is increased by the operation of the throttle valve being opened once and closed finally, the negative pressure on the down stream portion from the throttle valve in the intake path of the engine can be increased and therefore the negative pressure in the vacuum type booster can be increased. As a result, the vacuum type booster can obtain enough negative pressure so as to work as an automatic brake when the vehicle is traveling on a downhill road and the automatic transmission is shifted to the N range.

Further, since the operation of the throttle valve being opened once and closed finally is carried out when the automatic transmission is shifted to the N range, the vehicle has no shocks.

Figure 13:
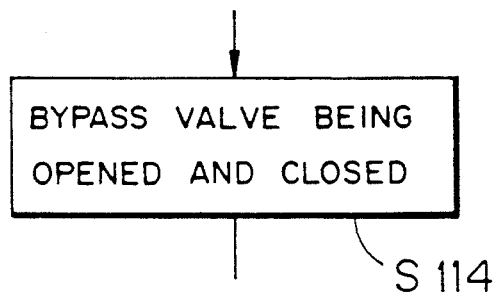
FIGS. 13 and 14 are one step in a flow chart respectively showing the content of the control operation carried out by the automatic braking system according to other examples of the fifth embodiment of the present invention.

In the fifth embodiment of the present invention, an operation of the bypass valve 47 being opened once and closed finally shown as S114 in FIG. 13 may be employed instead of S104 in FIG. 12. By the above-mentioned operation of the bypass valve, the engine rotation speed can be increased.

Figure 14:
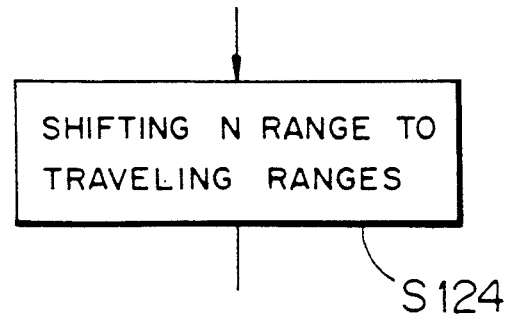

Further, an operation of the automatic transmission being shifted from N range to a traveling range shown as S124 in FIG. 14 may be employed instead of S104 in FIG. 12. By the above-mentioned operation of the automatic transmission, the engine rotation speed can also be increased.

The fifth embodiment of the present invention may be applied to a vehicle having a manual transmission which includes a device carrying out the operation of shifting the N range to the traveling range forcefully.

According to the fifth embodiment of the present invention, as described above, the vacuum-type booster can obtain enough negative pressure so as to work as an automatic brake since the negative pressure on the down stream portion from the throttle valve in the intake path of the engine is increased when the engine rotation speed is increased. As a result, the automatic brake can be operated with certainty even if the distance between the vehicle and the obstacle ahead is smaller than the threshold $L_0$ at which the automatic brake starts to be operated.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. An automatic braking system for a motor vehicle having a plurality of wheels comprising:

means for detecting a distance and a relative speed between the motor vehicle and an obstacle in front of the motor vehicle;

judging means for judging an alarm sounding region and a region in which the vehicle has a possibility of contact with the obstacle based on the distance and the relative speed detected;

an automatic brake for automatically braking said wheels when the judging means judges the region in which the motor vehicle has the possibility of contact with the obstacle in front of the motor vehicle, said automatic brake including a vacuum-type booster which has a first chamber, to which negative pressure is introduced, and a second chamber, to which atmospheric pressure is introduced, said first chamber being connected to a portion of an intake path of an engine downstream from a throttle valve disposed within said intake path of an engine, said booster using a pressure difference between the negative pressure and the atmospheric pressure;

means for increasing the negative pressure in the first chamber of the vacuum-type booster prior to operation of the automatic brake, said means for increasing the negative pressure including throttle valve control means for closing the throttle valve for a predetermined time so as to increase the negative pressure in the first chamber of the booster; and means for detecting a steering operation by a driver, the throttle valve control means not closing the throttle valve when the means for detecting a steering operation detects the steering operation.

2. An automatic braking system according to claim 1, wherein said throttle valve control means opens the throttle valve when the means for detecting a steering operation detects the steering operation when the throttle valve control means closes the throttle valve.

3. An automatic braking system according to claim 2, wherein a brake pedal is operatively connected to the booster and said predetermined time is longer when the brake pedal is not operated.

4. An automatic braking system for a motor vehicle having a plurality of wheels comprising:

means for detecting a distance and a relative speed between the motor vehicle and an obstacle in front of the motor vehicle;

judging means for judging an alarm sounding region and a region in which the vehicle has a possibility of contact with the obstacle based on the distance and the relative speed detected;

an automatic brake for automatically braking said wheels when the judging means judges the region in which the motor vehicle has the possibility of contact with the obstacle in front of the motor vehicle, said automatic brake including a vacuum-type booster which has a first chamber, to which negative pressure is introduced, and a second chamber, to which atmospheric pressure is introduced, said first chamber being connected to a portion of an intake path of an engine downstream from a throttle valve disposed within said intake path of an engine, said booster using a pressure difference between the negative pressure and the atmospheric pressure;

means for increasing the negative pressure in the first chamber of the vacuum-type booster prior to operation of the automatic brake, said means for increasing the negative pressure including throttle valve control means for closing the throttle value; and a pressure sensor detecting the negative pressure in the first chamber of the booster, the throttle valve control means closing the throttle valve until the negative pressure increases to a predetermined valve so as to increase the negative pressure in the first chamber when the negative pressure detected by the pressure sensor is smaller than a second predetermined value.

5. An automatic braking system according to claim 4, wherein a brake pedal is operatively connected to the booster and said predetermined time is longer when the brake pedal is not operated.

6. An automatic braking system for a motor vehicle having a plurality of wheels comprising:

means for detecting a distance and a relative speed between the motor vehicle and an obstacle in front of the motor vehicle;

judging means for judging an alarm sounding region and a region in which the vehicle has a possibility of contact with the obstacle based on the distance and the relative speed detected;

an automatic brake for automatically braking said wheels when the judging means judges the region in which the motor vehicle has the possibility of contact with the obstacle in front of the motor vehicle, said automatic brake including a vacuum-type booster which has a first chamber, to which negative pressure is introduced, and a second chamber, to which atmospheric pressure is introduced, said first chamber being connected to a portion of an intake path of an engine downstream from a throttle valve disposed within said intake path of an engine, said booster using a pressure difference between the negative pressure and the atmospheric pressure; and means for increasing the negative pressure in the first chamber of the vacuum-type booster prior to operation of the automatic brake, said means for increasing the negative pressure including throttle valve control means for closing the throttle valve for a predetermined time so as to increase the negative pressure in the first chamber of the booster, wherein said throttle valve control means closes the throttle valve at a speed which depends on a friction coefficient $\mu$ of the road surface.

7. An automatic braking system according to claim 6, wherein said throttle valve control means closes the throttle valve at a higher speed as the friction coefficient of the road surface becomes larger.

8. An automatic braking system for a motor vehicle having a plurality of wheels comprising:

means for detecting a distance and a relative speed between the motor vehicle and an obstacle in front of the motor vehicle;

judging means for judging an alarm sounding region and a region in which the vehicle has a possibility of contact with the obstacle based on the distance and the relative speed detected;

an automatic brake for automatically braking said wheels when the judging means judges the region in which the motor vehicle has the possibility of contact with the obstacle in front of the motor vehicle, said automatic brake including a vacuum-type booster which has a first chamber, to which negative pressure is introduced, and a second chamber, to which atmospheric pressure is introduced, said first chamber being connected to a portion of an intake path of an engine downstream from a throttle valve disposed within said intake path of an engine, said booster using a pressure difference between the negative pressure and the atmospheric pressure; and means for increasing the negative pressure in the first chamber of the vacuum-type booster prior to operation of the automatic brake, said means for increasing the negative pressure including throttle valve control means for closing the throttle valve for a predetermined time so as to increase the negative pressure in the first chamber of the booster, wherein said throttle valve control means closes the throttle valve at a speed which is dependent on a degree of opening of the throttle valve at the time of operation of the throttle valve continue means.

9. An automatic braking system according to claim 8, wherein said throttle valve control means closes the throttle valve at a higher speed as the degree of opening of the throttle valve becomes larger.

10. An automatic braking system for a motor vehicle having a plurality of wheels comprising:
  means for detecting a distance and a relative speed between the motor vehicle and an obstacle in front of the motor vehicle;
  judging means for judging an alarm sounding region and a region in which the vehicle has a possibility of contact with the obstacle based on the distance and the relative speed detected;
  an automatic brake for automatically braking said wheels when the judging means judges the region in which the motor vehicle has the possibility of contact with the obstacle in front of the motor vehicle, said automatic brake including a vacuum-type booster which has a first chamber, to which negative pressure is introduced, and a second chamber, to which atmospheric pressure is introduced, said first chamber being connected to a portion of an intake path of an engine downstream from a throttle valve disposed within said intake path of an engine, said booster using a pressure difference between the negative pressure and the atmospheric pressure; and
  means for increasing the negative pressure in the first chamber of the vacuum-type booster prior to operation of the automatic brake, wherein said negative pressure increasing means includes transmission control means for prohibiting a shift up operation of a transmission driven by said engine so as to increase the negative pressure in the first chamber of the booster.

11. An automatic braking system according to claim 10, wherein said transmission control means carries out a shift down operation.

12. An automatic braking system according to claim 11, wherein said system further comprises means for detecting a steering operation by the driver, and the transmission control means does not carry out the shift down operation when the steering operation detecting means detects the steering operation.

13. An automatic braking system for a motor vehicle having a plurality of wheels comprising:
  means for detecting a distance and a relative speed between the motor vehicle and an obstacle in front of the motor vehicle;
  judging means for judging an alarm sounding region and a region in which the vehicle has a possibility of contact with the obstacle based on the distance and the relative speed detected;
  an automatic brake for automatically braking said wheels when the judging means judges the region in which the motor vehicle has the possibility of contact with the obstacle in front of the motor vehicle, said automatic brake including a vacuum-type booster which has a first chamber, to which negative pressure is introduced, and a second chamber, to which atmospheric pressure is introduced, said first chamber being connected to a portion of an intake path of an engine downstream from a throttle valve disposed within said intake path of an engine, said booster using a pressure difference between the negative pressure and the atmospheric pressure; and
  means for increasing the negative pressure in the first chamber of the vacuum-type booster prior to operation of the automatic brake, wherein said means for increasing the negative pressure includes throttle valve control means for closing the throttle valve completely at a predetermined time so as to increase the negative pressure in the first chamber of the booster after a condition of the throttle valve being opened has continued for a predetermined time and wherein said negative pressure increasing means includes transmission control means for shifting a transmission driven by the engine to neutral range when the throttle valve is closed completely by the throttle valve control means.

14. An automatic braking system for a motor vehicle having a plurality of wheels comprising:
  means for detecting a distance and a relative speed between the motor vehicle and an obstacle in front of the motor vehicle;
  judging means for judging an alarm sounding region and a region in which the vehicle has a possibility of contact with the obstacle based on the distance and the relative speed detected;
  an automatic brake for automatically braking said wheels when the judging means judges the region in which the motor vehicle has the possibility of contact with the obstacle in front of the motor vehicle, said automatic brake including a vacuum-type booster which has a first chamber, to which negative pressure is introduced, and a second chamber, to which atmospheric pressure is introduced, said first chamber being connected to a portion of an intake path of an engine downstream from a throttle valve disposed within said intake path of an engine, said booster using a pressure difference between the negative pressure and the atmospheric pressure; and
  means for increasing the negative pressure in the first chamber of the vacuum-type booster prior to operation of the automatic brake, wherein said negative pressure increasing means includes engine control means for increasing rotation speed of said engine so as to increase the negative pressure in the first chamber of the booster.

15. An automatic braking system according to claim 14, wherein said engine control means increases the rotation speed of the engine by opening and then closing the throttle valve.

16. An automatic braking system according to claim 15, wherein said engine control means increases the rotation speed of the engine when the vehicle speed is smaller than a predetermined value or when the engine rotation speed is smaller than a predetermined value.

17. An automatic braking system according to claim 15, wherein a transmission driven by the engine is shifted to neutral prior to the engine control means increasing the rotation speed of the engine.

18. An automatic braking system according to claim 14, wherein said engine control means increases the rotation speed of the engine by a shift down operation of a transmission driven by the engine.

19. An automatic braking system according to claim 18, wherein said engine control means continues the shift down operation of the transmission when the driver is operating a brake pedal.

20. An automatic braking system for a motor vehicle having a plurality of wheels comprising:
   means for detecting a distance and a relative speed between the motor vehicle and an obstacle in front of the motor vehicle;
   judging means for judging an alarm sounding region and a region in which the vehicle has a possibility of contact with the obstacle based on the distance and the relative speed detected;
   an automatic brake for automatically braking said wheels when the judging means judges the region in which the motor vehicle has the possibility of contact with the obstacle in front of the motor vehicle, said automatic brake including a vacuum-type booster which has a first chamber, to which negative pressure is introduced, and a second chamber, to which atmospheric pressure is introduced, said first chamber being connected to a portion of an intake path of an engine downstream from a throttle valve disposed within said intake path of an engine, said booster using a pressure difference between the negative pressure and the atmospheric pressure; and
   means for increasing the negative pressure in the first chamber of the vacuum-type booster prior to operation of the automatic brake, wherein said means for increasing the negative pressure increases the negative pressure in the first chamber of the booster when a condition of a transmission driven by the engine is shifted to neutral range and the vehicle speed has continued to be greater than a predetermined value for a predetermined time.

21. An automatic braking system according to claim 20, wherein said negative pressure increasing means increases the negative pressure in the first chamber of the booster by increasing the rotation speed of the engine.

22. An automatic braking system according to claim 20, wherein said means for increasing the negative pressure increases the negative pressure in the first chamber of the booster by shifting the transmission out of neutral into engagement.

* * * * *